(12) United States Patent
Jaiswal et al.

(10) Patent No.: US 9,218,371 B2
(45) Date of Patent: Dec. 22, 2015

(54) AUTOMATIC TABLE CLEANUP FOR RELATIONAL DATABASES

(75) Inventors: Peeyush Jaiswal, Boca Raton, FL (US); Burt L. Vialpando, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 13/408,161

(22) Filed: Feb. 29, 2012

(65) Prior Publication Data

US 2013/0226882 A1     Aug. 29, 2013

(51) Int. Cl.
     G06F 17/30     (2006.01)
(52) U.S. Cl.
     CPC .............................. *G06F 17/30303* (2013.01)
(58) Field of Classification Search
     USPC .................................................. 707/694, 692
     See application file for complete search history.

(56) References Cited

U.S. PATENT DOCUMENTS

| | | |
|---|---|---|
| 7,188,116 B2 | 3/2007 | Cheng |
| 7,302,455 B1 | 11/2007 | Cordsmeyer et al. |
| 7,890,509 B1 * | 2/2011 | Pearcy et al. ................. 707/736 |
| 2002/0095408 A1 | 7/2002 | Cheng |
| 2005/0071320 A1 | 3/2005 | Chkodrov et al. |
| 2007/0038631 A1 | 2/2007 | Hiraga et al. |
| 2007/0180490 A1 * | 8/2007 | Renzi et al. ........................ 726/1 |
| 2007/0294308 A1 * | 12/2007 | Megerian ...................... 707/200 |
| 2012/0136904 A1 * | 5/2012 | Venkata Naga Ravi ...... 707/803 |

OTHER PUBLICATIONS

Radford University, ITEC 340 SQL #4 DML(insert, delete, update), Jan 1, 1981, Radford university.*

* cited by examiner

*Primary Examiner* — Amresh Singh
(74) *Attorney, Agent, or Firm* — John Pivnichny; Roberts Mlotkowski Safran & Cole, P.C.

(57) ABSTRACT

An approach for an automatic table cleanup process of use, implemented in relational databases, are provided. A method includes setting up a table cleanup process in a database which is operable to perform an automatic table cleanup on a table within the database using an auto purge value associated with the table. The method further includes altering the table with a virtual column to keep track of dates on the table. The method further includes turning on an automatic table maintenance capability of the database to include and initiate the table cleanup process. The method further includes running the table cleanup process to perform the automatic table cleanup using dates which are automatically filled in during an insert or update operation on the table, the table cleanup process comprising looking through the records and automatically purging the table when the auto purge value has been met.

24 Claims, 6 Drawing Sheets

200 ↘

205 — Current Date: 12/12/2012

| Table | Auto Purge |
|---|---|
| 1 | 90 |
| 2 | 0 |

210 — Table | Auto Purge — 215

| Data for Table 1 | Update Date |
|---|---|
| 11 | 12/12/2012 |
| 22 | 11/11/2011 |
| 33 | 10/10/2010 |

225 — Data for Table 1 | Update Date — 230

FIG. 2B

AUTOMATIC TABLE CLEANUP FOR RELATIONAL DATABASES

TECHNICAL FIELD

The present invention generally relates to relational databases, and more particularly, to relational databases comprising an automatic purge process of one or more tables.

BACKGROUND

Databases continually grow unless a database administrator drops tables completely, truncates or empties table data, and/or archives and later deletes the table data. While these types of maintenance may be necessary for key application data in databases, it is common for many tables in the databases to be used for purposes which require data to be stored for only a limited time. Such non-critical tables are not part of the key application data themselves, so they pose no real risk to application integrity of the databases if they were deleted. For example, the non-critical tables may include repository tables, monitoring or event monitoring tables, queuing tables, etc.

However, in current database applications, these non-critical tables require maintenance to keep them from growing to unwieldy sizes. Such maintenance is performed separately from the database applications by a database administrator. However, such maintenance is only provided periodically and reactively when it is found that the non-critical tables require such maintenance. In addition, the table maintenance by the database administrator is prone to human error, as well as instances where the database administrator neglects to perform such table maintenance, which may lead to full storage errors. Further, the table maintenance by the database administrator is tedious in that the database administrator has to manually and constantly determine what data to delete and when such data is to be deleted.

SUMMARY

In a first aspect of the invention, a method comprises setting up a table cleanup process in a database which is operable to perform an automatic table cleanup on a table within the database using an auto purge value associated with the table. The method further comprises altering the table with a virtual column to keep track of dates on the table. The method further comprises turning on an automatic table maintenance capability of the database to include and initiate the table cleanup process. The method further comprises running the table cleanup process to perform the automatic table cleanup using dates which are automatically filled in during an insert or update operation on the table, the table cleanup process comprising looking through the records and automatically purging the table when the auto purge value has been met.

In another aspect of the invention, a system implemented in a computer infrastructure is operable to: set up at least one table in the database for automatic table cleanup of the at least one table, the at least table comprising a date field with at least one update date of a row of the at least one table; set up a table cleanup process operable to perform the automatic table cleanup; and run the table cleanup process to perform the automatic table cleanup based on the date field. The data field is virtual and automatic by providing a create or alter operation in a table with an auto purge characteristic such that the database automatically inserts a virtual date in its records, whether during an insert or update operation of each record.

In an additional aspect of the invention, a computer program product includes a tangible computer usable storage medium having readable program code embodied in the tangible computer usable storage medium. The computer program product includes at least one component operable to provide an auto purge value which represents a time period that at least one table of a database will retain data. The at least one component is further operable to automatically purge the data which is retained for longer than the auto purge value.

In another aspect of the invention, a method of automatic table cleanup for relational databases, includes providing a computer infrastructure operable to set up at least one table in a database for automatic table cleanup of the at least one table. The at least one table includes a date field with at least one update date of a row of the at least one table. The computer infrastructure is further operable to set an auto purge value for the at least one table that represents a time period which the at least one table will retain data. The computer infrastructure is further operable to set up a table cleanup process operable to perform the automatic table cleanup. The computer infrastructure is further operable to run the table cleanup process to perform the automatic table cleanup based on the date field and the auto purge value.

In a further aspect of the invention, a computer system for automatic table cleanup for relational databases, includes a CPU, a computer readable memory and a tangible computer readable storage media. First program instructions set up at least one table in a database for automatic table cleanup of the at least one table. That table will have a virtual date added for any record that is inserted or updated. Second program instructions set an auto purge value for the at least one table that represents a time period which the at least one table will retain data. Third program instructions determine, for each of one or more rows of the at least one table, a difference between the at least one update date and a current date of the database. Fourth program instructions delete the row after determining that the difference is greater than the auto purge value. The first, second, third, and fourth program instructions are stored on the tangible computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of embodiments of the present invention.

FIG. 2A shows an illustrative database system catalog in accordance with aspects of the invention;

FIG. 2B shows an illustrative database table in accordance with aspects of the invention.

DETAILED DESCRIPTION

Figure 1:
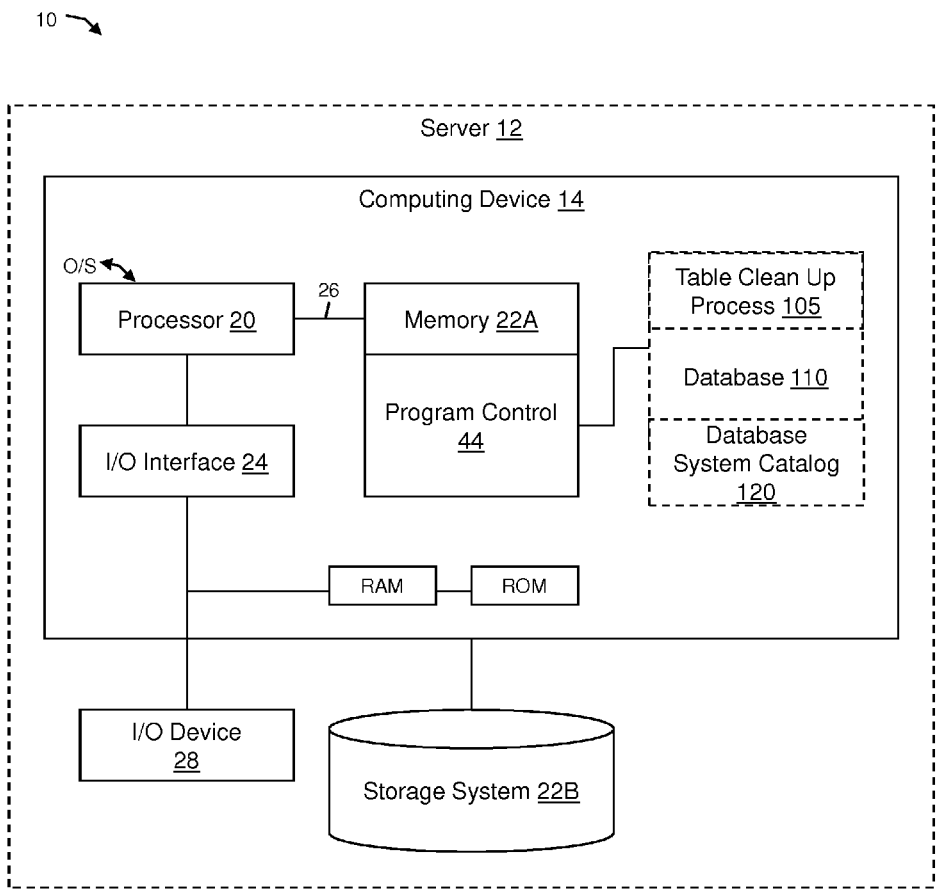
FIG. 1 shows an illustrative environment for implementing steps in accordance with aspects of the invention.

The present invention generally relates to relational databases, and more particularly, to a relational databases comprising an automatic purge process of one or more tables within the relational database. More specifically, in embodiments, the present invention provides an automatic table cleanup process operable to automatically cleanup or maintain one or more tables in a database to prevent such tables from overwhelming the database. Advantageously, the automatic table cleanup process requires a single set up by a database administrator, thus eliminating the tedious task of monitoring the database. The tables that may require maintenance by the present invention include non-key application data or non-critical tables, such as repository tables, monitoring or event monitoring tables, queuing tables, etc.

More specifically, in embodiments, the present invention provides a database with a built-in process to automatically purge non-critical or non-key tables within the database. In embodiments, the process of automatic purge is built directly into a relational database. Advantageously, after setting auto purge in the database, the remaining processes of the present invention occur automatically. For example, after setting up auto purge on a table, the table itself is altered with a virtual column to keep track of dates on that table, and these dates are filled in automatically during "insert" and "update" operations on that table. This is part of the built-in database operations. In this way, the present invention provides an automatic maintenance process that will look through these tables and record and purge the appropriate tables based on a purge value, for example. This process is separate from any individual table "alter" or "create" operation, and is also different from the "update" and "insert" operations.

In implementing the present invention, individual scripts are no longer required for each table in order to purge such tables. Instead, the purge process runs automatically, without the need for an administrator to individually monitor non-critical or non-key tables within the database. Thus, the auto purge process of the present invention is no longer performed on a reactive basis, requiring manual monitoring and scripts for each individual table. Thus, in specific embodiments of the present invention, the database creates tables with automatic purge ("auto-purge") characteristics, which do not require separate scripts for each table; instead, once the database is turned on or a master script is enabled (e.g., turned on), non-critical tables can be purged based on a comparison of a last update and a scheduled auto-purge date. For example, an administrator can set an auto purge date of 90 dates, as one illustrative example, such that if the table is not updated (e.g., modified, etc.) within such date, the table data will automatically be deleted, once the database is turned on or the master script is enabled. In this way, it is now possible to provide automatic maintenance (e.g., cleanup) of any number of tables in the database by merely turning on the database auto maintenance feature or scheduling a master auto page script.

In further implementations, the processes of the present invention may provide, create, and/or alter an update date field, where each value in the update date field represents an update date in which a row of the table is updated via an insert statement and/or an update statement of the database. The table may further include a value of an auto purge. More specifically, in embodiments, a create table statement and an alter table statement can include a keyword or numeric characteristic "auto purge" which represents a number of days that the table in the database will retain its data. When the auto purge is set by the database administrator to a value other than 0, null, or −1, the auto purge may indicate that the table is eligible for the automatic table cleanup.

Advantageously, the automatic table cleanup process proactively maintains a database in a manageable size by deleting rows of non-critical tables. In this way, the database administrator is no longer required to consistently monitor the database and reactively perform maintenance in the database, which is prone to inaccuracy, is tedious, and is expensive. For example, the database administrator can set up the automatic table cleanup process a single time, without requiring to constantly write customized scripts for each table, or to perform impromptu procedures, to cleanup non-critical tables in the database. Accordingly, by utilizing the automatic table cleanup process, table cleanup in databases are less prone to human error and omissions due to manual maintenance.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowcharts and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handset, keyboard, etc.

In general, the processor 20 executes computer program code (e.g., program control 44), which can be stored in the memory 22A and/or storage system 22B. Moreover, in accordance with aspects of the invention, the program control 44 controls a table cleanup process 105, implemented on a database 110, e.g., the processes described herein. The table cleanup process 105 can be implemented as one or more program code in the program control 44 stored in memory 22A as separate or combined modules. Additionally, the table cleanup process 105 may be implemented as separate dedicated processors or a single or several processors to provide the function of this process in a database, and preferably a relational database. Moreover, it should be understood by those of ordinary skill in the art that the table cleanup process 105 is used as a general descriptive term for providing the features and/or functions of aspects of the present invention. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In embodiments, the table cleanup process 105 is built into the database 110 to automatically cleanup or maintain one or more tables in the database 110 that require cleanup or maintenance. For example, such tables may include non-key application data or non-critical tables, such as repository tables, monitoring or event monitoring tables, queuing tables, etc. The database 110 may be implemented by a database application, such as IBM® DB2® (IBM and DB2 are trademarks of International Business Machines Corporation registered in many jurisdictions worldwide). In embodiments, the table cleanup process 105 and the database 110 may be set up once for the automatic table cleanup of all of these non-critical tables by a database administrator or service provider.

More specifically, in embodiments, to set up the database 110 for the automatic table cleanup, the database 110 can include a create table statement and an alter table statement, which allow the database administrator to create and alter, respectively, at least one table in the database 110 with an "auto purge" characteristic. The database 110 may create or alter the table in the database 110 with the "auto purge" characteristic, and thereafter maintain a last insert or update date for each record in the table. More specifically, in embodiments, the table itself is altered with a virtual column to keep track of dates on that table. As discussed herein, these dates are filled in automatically during "insert" or "update" operations on that table. Each value in the update date field represents an update date in which a respective row (or record) of the table is updated via an insert statement and/or an update statement of the database 110, as discussed herein. In addition, based on the alter table statement, the database 110 populates the update date field of each existing row of the table with a current date (e.g., a global date) of the database 110. In embodiments, the "update" operation a virtue row, for example, within the table.

In embodiments, the create table statement and the alter table statement can include a keyword or numeric characteristic "auto purge", which represents a number of days that the table in the database 110 will retain its data. When the auto purge is set by the database administrator to a value other than 0, null, or −1, the auto purge will indicate that the table is eligible for the automatic table cleanup. The database 110 may retain the auto purge for the table in a database system catalog 120 (or dictionary) of the database 110. The database system catalog 120 may include the auto purge and also other keywords, characteristics, and/or attributes of each table in the database 110, e.g., the current date of the database 110. Accordingly, via the auto purge in the create table statement and the alter table statement, the database administrator may set the table in the database 110 to be automatically cleaned up or deleted when, for example, the table is a non-critical table. Alternatively, the database administrator may set the table to be maintained (e.g., not automatically cleaned up or deleted) when, e.g., the table is a critical table including key application data.

In accordance with further aspects of the invention, the database 110 can include the insert statement and the update statement, which allow the database administer to insert and update, respectively, a row or record of the table in the database 110. When the row of the table is inserted or updated, the database 110 may populate the update date field of the row with the current date of the database 110 automatically by virtue of the "auto purge" value having been set. Tables without the "auto purge" value do not have this behavior. As such, each row of the table may have a different update date in the respective update date field.

In embodiments, the database 110 can set up the table cleanup process 105 to be included in an automatic table maintenance capability of the database 110. In embodiments, the automatic table maintenance capability may include any type of autonomic computing capabilities, for example, automatic running of statistics, automatic backup, automatic reorganization, and other complex functions. When the database 110 includes the automatic table maintenance capability, the database 110 (e.g., via instruction of the database administrator) may turn on this automatic table maintenance capability to include and initiate the automatic table cleanup as a function to perform (e.g., to include and turn on the table cleanup process 105).

In embodiments, the database 110 can set up the table cleanup process 105 as a script in the computing device 14. The database 110 may schedule the table cleanup process 105 once to run the automatic table cleanup, in a scheduling facility of the database 110. After this one-time scheduling of the automatic table cleanup, the table cleanup process 105 may repeatedly perform the automatic table cleanup for each table in the database 110 without any further intervention or changes to the script, even if more tables are created or altered that require the automatic table cleanup. This is advantageous since, at most, only a single script is needed for multiple tables, even if additional tables are added to and/or altered in the database 110.

In embodiments, once the table cleanup process 105 is set up, the table cleanup process 105 can run an automatic table cleanup for each table in the database 110 that has the auto purge set to a numeric value (e.g., 90) greater than 0 or null. More specifically, in embodiments, for each row of each table with auto purge enabled, the table cleanup process 105 may automatically purge or delete the row when a difference (e.g., in days) between an update date in the update date field and the current date of the database 110, exceeds the auto purge value retrieved from the database system catalog 120. The table cleanup process 105 may run this automatic table cleanup process in a predetermined frequency of time, e.g., every two minutes, or any other time frame that best suits the situation.

In accordance with further aspects of the invention, the table cleanup process 105 and/or the database 110 can include one or more safety mechanisms which ensure that the automatic table cleanup is not performed inadvertently or by unauthorized persons. For example, in embodiments, the create table statement of the database 110, including the auto purge, may require the highest of database authorities (e.g., the database administrator) to set the create table statement. In another example, the alter table statement of the database 110, including the auto purge, may also require the highest of database authorities (e.g., the database administrator and/or an owner of a corresponding table) to set the alter table statement.

In embodiments, in implementations using an automatic table maintenance facility, such a facility can turn on or invoke the automatic table cleanup, e.g., to set up the table cleanup process 105. Thus, the automatic table cleanup would not be initiated by default. In implementations which do not use the automatic table maintenance facility, the database 110 may require the script which performs the automatic table cleanup (e.g., the table cleanup process 105) to be set up or scheduled one time (e.g., by the database administrator) before performing the automatic table cleanup. This also ensures that the automatic table cleanup may not be initiated by default.

In accordance with further aspects of the invention, the database 110 and/or the table cleanup process 105 can limit the value of the auto purge for each table in the database 110 to ensure that at least some of the data is kept in each table for a predetermined time period. This limited value may be set by a database vendor and/or the database administrator. In embodiments, the limited value of the auto purge may be adjustable via a database parameter of the database 110, and may include a minimum or maximum default value. For example, the limited value of the auto purge may include a minimum default value of 90 days, if otherwise not set by the database administrator. Accordingly, even when the automatic table cleanup is set up and initiated, the data would be kept in each table for 90 days. One of ordinary skill in the art would recognize that other values are also contemplated by the invention.

In embodiments, the database 110 and/or the table cleanup process 105 can display all tables in the database 110 that are subject to the automatic table cleanup. Such tables may be displayed through a system catalog or data dictionary view, and/or through a database command, e.g., "list auto purge tables". The tables subject to the automatic table cleanup may be displayed in a database schema including, for example, a table name and a value of the respective auto purge. These displayed tables may allow the database administrator to quickly and easily check to ensure that no critical tables are subject to the automatic table cleanup.

Still referring to FIG. 1, the computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

FIG. 2A shows an illustrative database system catalog 200 (e.g., the database system catalog 120 in FIG. 1) in accordance with aspects of the invention. In embodiments, the database system catalog 200 can include a current date 205 of a database, such as, for example, the database 110 in FIG. 1. The current date 205 may be in a month, date, and year (e.g., mm/dd/yyyy) format; although other formats are contemplated by the invention. The database system catalog 200 may further include a table name or number field 210 in which each value represents a name or number of a table in the database. The database system catalog 200 may further include an auto purge field 215, in which each value represents a value of an auto purge of a respective table. For example, the database system catalog 200 may indicate a current date 205 of Dec. 12, 2012, an auto purge of 90 days for table 1, and an auto purge of 0 for table 2, which indicates a disabling of automatic table cleanup for table 2.

FIG. 2B shows an illustrative database table 220 in accordance with aspects of the invention. In embodiments, the database table 220 can include a data field 225 in which each value represents data of a table in a database, e.g., the database 110 in FIG. 1. The database table 220 may represent table 1 in FIG. 2A and further include an update date field 230, in which each value represents an update date of the corresponding data in a same row, e.g., when the data is inserted or updated by insert or update statements, respectively, of the database. For example, the database table 220 may include a first row including data "11" and an update date of Dec. 12, 2012, a second row including data "22" and an update date of Nov. 11, 2011, and a third row including data "33" and an update date of Oct. 10, 2010. Each of these rows may be deleted based on the automatic table cleanup process of the present invention. This illustration shows that the second row for table 1 with data "22" and the third row for table 1 with data "33" as being eligible for automatic purge since they exceed the auto purge value of 90 days from the current system date of Dec. 12, 2012.

FIGS. 3-6 show illustrative flows for performing aspects of the present invention. The steps of FIGS. 3-6 may be implemented in the environment of FIG. 1, for example.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 3:
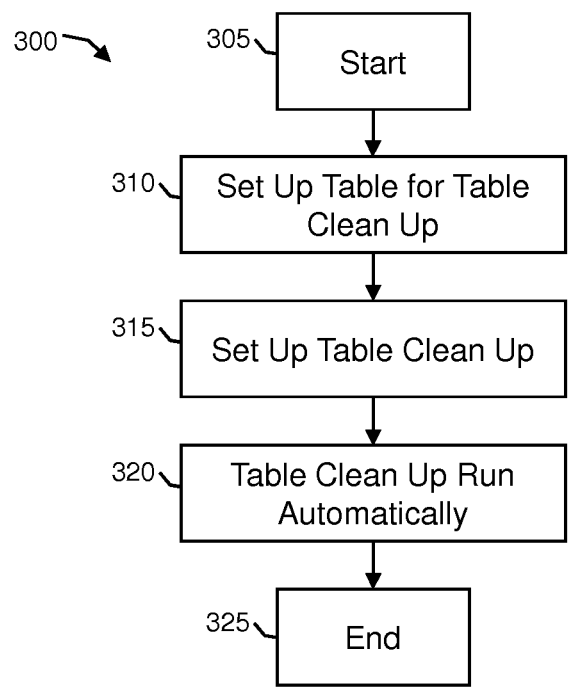
FIGS. 3-6 show illustrative flows in accordance with aspects of the invention.

FIG. 3 depicts a flow for a process 300 in accordance with aspects of the present invention. In embodiments, the process 300 can involve the table cleanup process 105 and the database 110 in FIG. 1. The process 300 may be performed to automatically cleanup or maintain one or more tables in a database (e.g., the database 110) that require cleanup or maintenance. At step 305, the process starts.

At step 310, the database can set up at least one table in the database for the automatic table cleanup. In embodiments, this setting up of the table may include creating or altering the table with the "auto purge" value which will automatically include and update a virtual date field, where each value in the update date field may represent an update date in which a row of the table is updated. The setting up of the table further includes setting a value of an auto purge for the created or altered table that represents a number of days which the table will retain its data. When the auto purge is set to a value other than 0, null, or −1, the auto purge will indicate that the table is eligible for the automatic table cleanup.

At step 315, the database can set up the table cleanup process (e.g., the table cleanup process 105) to run the automatic table cleanup. In embodiments, the setting up of the table cleanup process may include turning on an automatic table maintenance capability to include and initiate the automatic table cleanup as a function to perform, e.g., to turn on the table cleanup tool. In embodiments, the database may set up the table cleanup method as a script in the database. For example, the database may schedule once the table cleanup process to run the automatic table cleanup, in a scheduling facility of the database.

At step 320, the database can automatically run the table cleanup process to perform the automatic table cleanup. In embodiments, the running of the table cleanup process may include deleting each row in the table that has a difference between a respective update date and a current date of the database, that is greater than the table's auto purge value. At step 325, the process ends.

Figure 4:
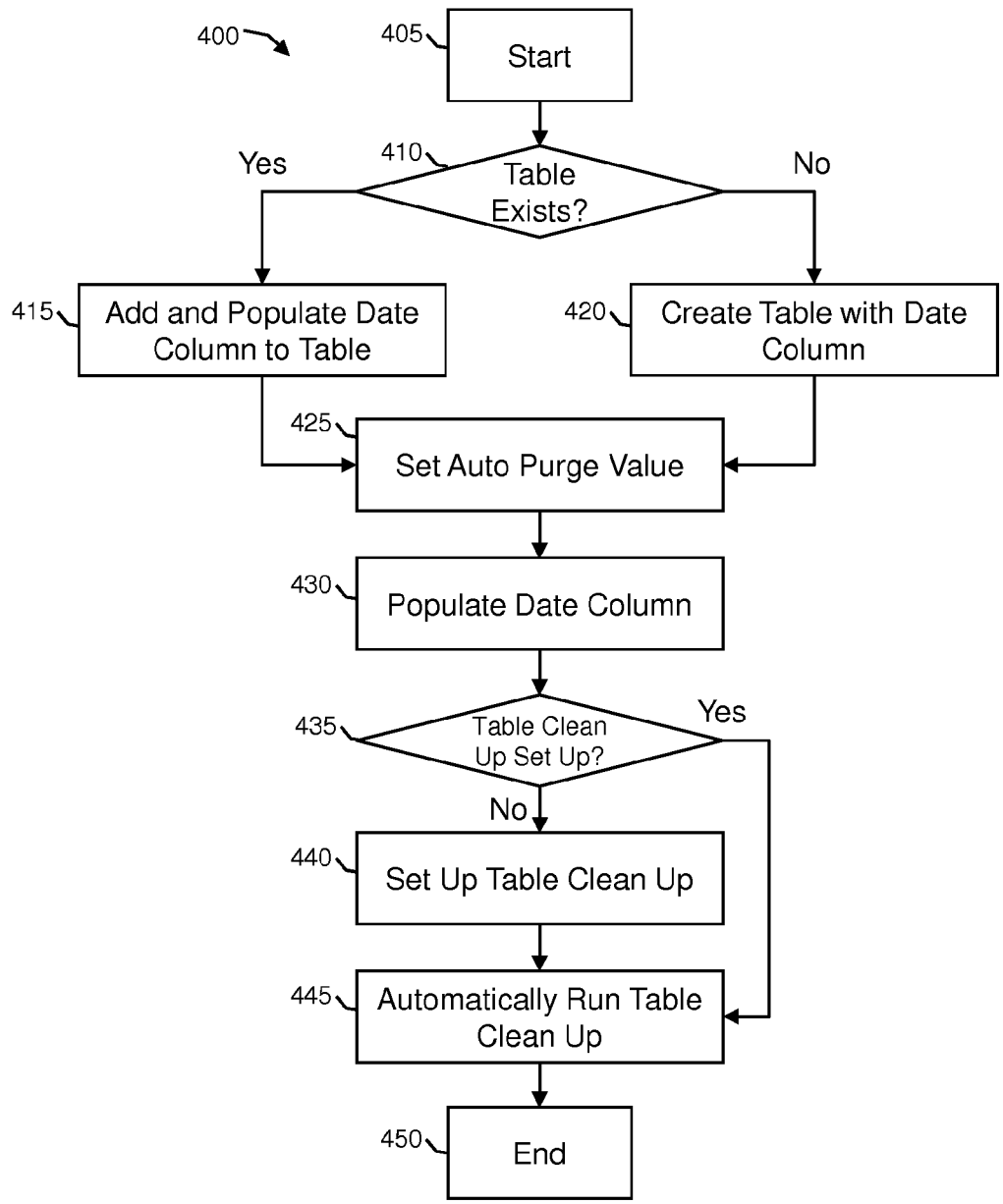

FIG. 4 depicts a flow for a process 400 in accordance with aspects of the present invention. In embodiments, the process 400 can involve the table cleanup process 105 and the database 110 in FIG. 1. The process 400 may be performed to automatically cleanup or maintain one or more tables in a database (e.g., the database 110) that require cleanup or maintenance. At step 405, the process starts.

At step 410, to set up the database for the automatic table cleanup, the database can determine whether at least one table exists in the database. In embodiments, this determining may include determining whether the database receives a create table statement or an alter table statement set by a database administrator, to create or alter, respectively, at least one table in the database. When at least one table exists in the database, the process continues at step 415. Otherwise, the process continues at step 420.

At step 415, the database can alter at least one table in the database and add an update date field to the table. Each value in the update date field may represent an update date in which a respective row of the table is updated. In addition, the database may populate the update date field of each existing row in the altered table with a current date of the database. At step 420, the database can create at least one table in the database with an update date field.

At step 425, the database can set a value of an auto purge for the created or altered table in the database, which represents a number of days that the table in the database will retain its data. When the auto purge is set by the database administrator to a value other than 0, null, or −1, the auto purge may indicate that the table is eligible for the automatic table cleanup. The database may set or retain the auto purge for the table in a database system catalog, e.g., the database system catalog 120 in FIG. 1.

At step 430, the database can populate the update date field in the created or altered table with the current date of the database when a respective row of the table is inserted or updated. Accordingly, each row of the table may have a different respective update date in the update date field. At step 435, the database can determine whether the table cleanup process (e.g., the table cleanup process 105 in FIG. 1) is set up for the automatic table cleanup. When the table cleanup process is not set up, the process continues at step 440. Otherwise, the process continues at step 445. At step 440, the database may set up the table cleanup process, as discussed herein. At step 445, the database may run the table cleanup process to perform the automatic table cleanup of at least one table in the database that has the auto purge set to a numeric value greater than 0 or null, as discussed herein. At step 450, the process ends.

Figure 5:
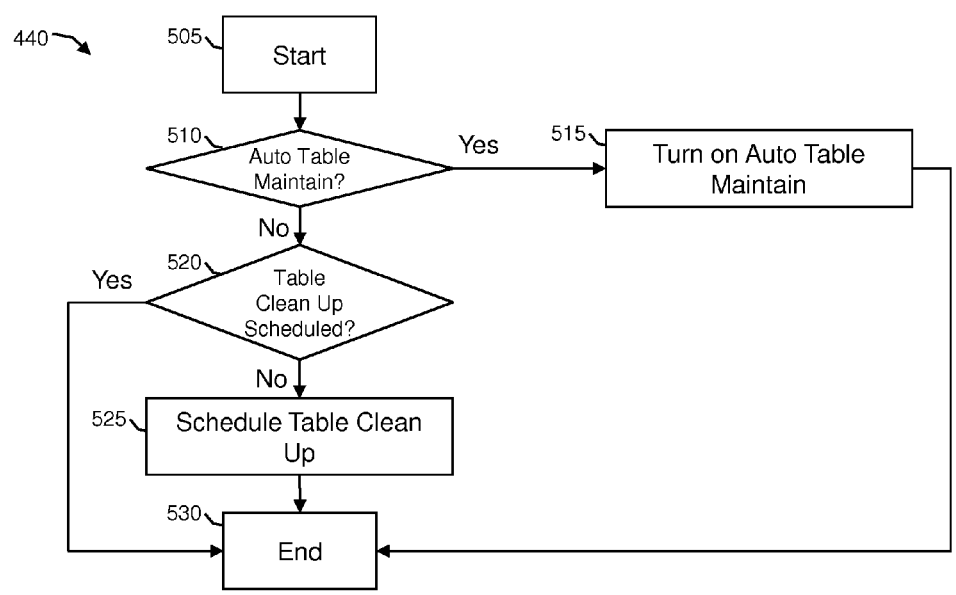

FIG. 5 depicts a flow for the process 440 of setting up the table cleanup process in FIG. 4 in accordance with aspects of the present invention. In embodiments, the process 440 can involve the table cleanup process 105 and the database 110 in FIG. 1. At step 505, the process starts. At step 510, the database may determine whether the database includes an automatic table maintenance capability, e.g., "auto table maintenance". In embodiments, the automatic table maintenance capability may include any type of autonomic computing capabilities, such as, for example, automatic running of statistics, automatic backup, automatic reorganization, and other complex functions. When the database includes the automatic table maintenance capability, the process continues at step 515. Otherwise, the process continues at step 520.

At step 515, the database can turn on this automatic table maintenance capability to include and initiate the automatic table cleanup as a function, e.g., to turn on the table cleanup process. When the database does not include the automatic table maintenance capability, the database may set up the table cleanup process as a script in the database. More specifically, in embodiments, at step 520, the database may determine whether the database has scheduled one time the table cleanup process to run the automatic table cleanup, in a scheduling facility of the database. When the database has not scheduled the automatic table cleanup, the process continues at step 525. Otherwise, the process continues at step 530.

At step 525, the database can schedule one time the table cleanup process to run the automatic table cleanup, in the scheduling facility. After this one-time scheduling of the automatic table cleanup, the table cleanup process may repetitively perform the automatic table cleanup without any further intervention or changes to the script, even if more tables are created or altered that require the automatic table cleanup. At step 530, the process ends.

Figure 6:
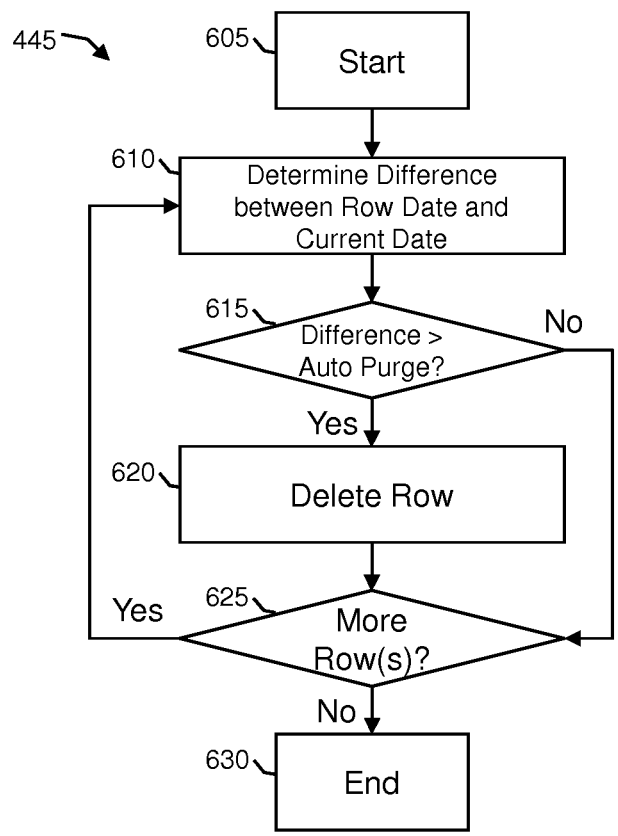

FIG. 6 depicts a flow for the process 445 of running the table cleanup process in FIG. 4 in accordance with aspects of the present invention. In embodiments, the process 445 can involve the table cleanup process 105 and the database 110 in FIG. 1. The process 445 may be performed to run the automatic table cleanup of at least one table in the database that has the auto purge set to a numeric value greater than 0 or null. At step 605, the process starts.

At step 610, for each row of the table with auto purge enabled, the table cleanup process can determine a difference (e.g., in days) between the respective update date in the update date field and the current date of the database. At step 615, the table cleanup process may determine whether this difference is greater than the value of the auto purge for the respective table that may be retrieved from the database system catalog, e.g., the database system catalog 120 in FIG. 1. When the difference is greater than the respective value of the auto purge, the process continues at step 620. Otherwise, the process continues at step 625.

At step 620, the table cleanup process can delete the row being evaluated, from the table. At step 625, the table cleanup process determines whether there are more row(s) in the table being evaluated. If there are more row(s) in the table, the process returns to step 610. Otherwise, the process continues at step 630. At step 630, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   setting up a table cleanup process in a database which is configured to perform an automatic table cleanup on a table within the database using an auto purge value associated with the table;
   altering the table with a virtual column to keep track of dates on the table;
   turning on an automatic table maintenance capability of the database to include and initiate the table cleanup process; and
   running the table cleanup process to perform the automatic table cleanup using dates which are automatically filled in during an insert or update operation on the table, the table cleanup process comprising looking through the records and automatically purging the table when the auto purge value has been met,
wherein the setting up of the table cleanup process comprises creating the table with the auto purge value that will automatically create a virtual date field based on a create table statement of the database, and
wherein the virtual date field comprises an update date in which a row of the table is updated.

2. The method of claim 1, wherein the setting up of the table comprises creating or altering the table with the auto purge value, which will add a date field to the table of the database.

3. The method of claim 2, wherein the setting up of the table with the auto purge value comprises automatically populating the virtual date field with at least the update date of the row of the table.

4. The method of claim 1, wherein the setting up of the table comprises populating a date field with at least one update date of all rows of the table based on an insert statement or an update statement of the database.

5. The method of claim 1, wherein the setting up of the table comprises setting the auto purge value for the table that represents a time period which the table will retain data.

6. The method of claim 5, wherein the setting of the auto purge value to a value other 0, null, or −1 indicates that the table is eligible for the automatic table cleanup.

7. The method of claim 1, wherein the auto purge is a process separate from an individual table alter or create operation, and is different from an update or insert operation.

8. The method of claim 1, wherein the setting up of the table cleanup process comprises scheduling the table cleanup process to run the automatic table cleanup in a scheduling facility of the database.

9. The method of claim 1, wherein the running of the table cleanup process comprises for each of one or more rows of the table, determining a difference between an update date of a row of the table and a current date of the database.

10. The method of claim 9, wherein the running of the table cleanup process comprises deleting a row after determining that the difference is greater than the auto purge value for the table.

11. The method of claim 10, wherein the auto purge value represents a time period which the table will retain data.

12. The method of claim 1, wherein a service provider at least one of creates, maintains, deploys, and supports a computer infrastructure configured to the steps of claim 1.

13. The method of claim 1, wherein the steps of claim 1 are provided by a service provider on a subscription, advertising, and/or fee basis.

14. A system implemented in a database, comprising:
a computer infrastructure comprising hardware configured to:
set up at least one table in the database for automatic table cleanup of the at least one table, the at least table comprising a virtual date field with at least one update date of a row of the at least one table;
set up a table cleanup process operable to perform the automatic table cleanup; and
run the table cleanup process to perform the automatic table cleanup based on the virtual date field, wherein:
the virtual date field is automatic by providing a create or alter operation in a table with an auto purge characteristic such that the database automatically inserts a virtual date in its records, whether during an insert or update operation of each record,
wherein the setting up of the at least one table comprises creating the at least one table with the auto purge characteristic that will automatically create the virtual date field based on a create table statement of the database,
wherein the virtual date field comprises the at least one update date in which the row of the at least one table is updated.

15. The system of claim 14, wherein the setting up of the at least one table further comprises at least one of:
adding the date field to the at least one table based on an alter table statement of the database; and
creating the at least one table with the date field based on the create table statement of the database.

16. The system of claim 14, wherein the setting up of the at least one table further comprises setting an auto purge value for the at least one table that represents a time period which the at least one table will retain data.

17. The system of claim 14, wherein the setting up of the table cleanup process comprises one of:
turning on an automatic table maintenance capability of the database to include and initiate the table cleanup process; and
scheduling the table cleanup process to run the automatic table cleanup in a scheduling facility of the database.

18. The system of claim 14, wherein the running of the table cleanup process comprises for each of one or more rows of the at least one table:
determining a difference between the at least one update and a current date of the database; and
deleting a row after determining that the difference is greater than an auto purge value for the at least one table, the auto purge value representing a time period which the at least one table will retain data.

19. A computer program product comprising a tangible non-transitory computer readable storage medium having readable program code embodied in the tangible non-transitory computer readable storage medium, the computer program product includes at least one component implemented on a computer having hardware and configured to:
setting up at least one table of a database;
provide an auto purge value which represents a time period that the at least one table of the database will retain data; and
automatically purge the data which is retained for longer than the auto purge value,
wherein the setting up of the at least one table comprises creating the at least one table with the auto purge value that will automatically create a virtual date field based on a create table statement of the database,
wherein the virtual date field comprises an update date in which a row of the table is updated.

20. The computer program product of claim 19, wherein the at least one component is further configured to:
automatically purge the data based on the auto purge value, the at least one update date, and a current date of the database.

21. A method of automatic table cleanup for relational databases, comprising:
providing a computer infrastructure configured to:
set up at least one table in a database for automatic table cleanup of the at least one table, the at least one table comprising a virtual date field with at least one update date of a row of the at least one table;
set an auto purge value for the at least one table that represents a time period which the at least one table will retain data;
set up a table cleanup process configured to perform the automatic table cleanup; and run the table cleanup process to perform the automatic table cleanup based on the virtual date field and the auto purge value,
wherein the setting up of the at least one table comprises creating the at least one table with the auto purge value that will automatically create the virtual date field based on a create table statement of the database,
wherein the virtual date comprises the at least one update date in which the row of the at least one table is updated.

22. The method of claim 21, wherein the setting up of the table cleanup process comprises at one of:
turning on an automatic table maintenance capability of the database to include and initiate the table cleanup process; and
scheduling the table cleanup process to run the automatic table cleanup in a scheduling facility of the database.

23. A computer system for automatic table cleanup for relational databases, comprising:
a CPU, a computer readable memory and a tangible computer readable storage media;
first program instructions to set up at least one table in a database for automatic table cleanup of the at least one table, the at least one table comprising a virtual date added for any record that is inserted, updated or deleted;
second program instructions to set an auto purge value for the at least one table that represents a time period which the at least one table will retain data;
third program instructions to determine, for each of one or more rows of the at least one table, a difference between the at least one update date and a current date of the database; and
fourth program instructions to delete the row after determining that the difference is greater than the auto purge value,
wherein the first, second, third, and fourth program instructions are stored on the tangible computer readable storage media for execution by the CPU via the computer readable memory,
wherein the setting up of the at least one table comprises creating the at least one table with the auto purge value that will automatically create a virtual date field based on a create table statement of the database,
wherein the virtual date field comprises an update date in which a row of the table is updated.

24. The computer system of claim 23, further comprising fifth program instructions to one of:
turn on an automatic table maintenance capability of the database to include and initiate a table cleanup process operable to perform the automatic table cleanup; and
schedule the table cleanup process to run the automatic table cleanup in a scheduling facility of the database.

* * * * *